(12) United States Patent
Zhan et al.

(10) Patent No.: US 8,422,179 B2
(45) Date of Patent: Apr. 16, 2013

(54) INRUSH CURRENT CONTROL

(75) Inventors: Xiaodong (David) Zhan, Plano, TX (US); Xiangxu (Alan) Yu, Shenzhen (CN)

(73) Assignee: Intersil Americas Inc., Milpitas, CA (US)

( * ) Notice: Subject to any disclaimer, the term of this patent is extended or adjusted under 35 U.S.C. 154(b) by 319 days.

(21) Appl. No.: 12/836,153

(22) Filed: Jul. 14, 2010

(65) Prior Publication Data

US 2011/0019316 A1 Jan. 27, 2011

Related U.S. Application Data

(60) Provisional application No. 61/227,772, filed on Jul. 22, 2009, provisional application No. 61/232,735, filed on Aug. 10, 2009.

(51) Int. Cl.
*H02H 9/08* (2006.01)
(52) U.S. Cl.
USPC ............................................ 361/18; 361/93.9
(58) Field of Classification Search ............ 361/18, 361/93.7–93.9, 111
See application file for complete search history.

(56) References Cited

U.S. PATENT DOCUMENTS

| | | | |
|---|---|---|---|
| 4,800,329 A | 1/1989 | Masaki | |
| 5,287,263 A | 2/1994 | Shilo | |
| 5,886,431 A * | 3/1999 | Rutigliano | 307/131 |
| 5,930,130 A | 7/1999 | Katly et al. | |
| 5,973,942 A * | 10/1999 | Nelson et al. | 363/21.01 |
| 5,995,392 A | 11/1999 | Turner | |
| 6,192,435 B1 * | 2/2001 | Takahashi | 710/302 |
| 6,356,468 B1 * | 3/2002 | Havukainen et al. | 363/49 |
| 7,615,965 B2 * | 11/2009 | Popescu-Stanesti et al. | 320/128 |
| 8,120,930 B2 * | 2/2012 | Kanno et al. | 363/17 |
| 2002/0191359 A1 | 12/2002 | Chen | |
| 2004/0080891 A1 | 4/2004 | Shyr et al. | |
| 2005/0231874 A1 | 10/2005 | Hussein et al. | |
| 2006/0022648 A1 * | 2/2006 | Ben-Yaakov et al. | 323/222 |
| 2007/0014134 A1 | 1/2007 | Shih | |
| 2007/0274104 A1 * | 11/2007 | Furukoshi et al. | 363/16 |

* cited by examiner

*Primary Examiner* — Danny Nguyen
(74) *Attorney, Agent, or Firm* — Vierra Magen Marcus LLP (57) ABSTRACT

An inrush current control circuit selectively short-circuit bypasses an inrush current limiting resistor (R1) of a power supply that includes a switching transistor (Q1) having a control terminal (gate or base) driven in dependence on a pulse width modulated (PWM) drive signal. The inrush current control circuit includes a bypass transistor (Q3), a first resistor (R3), a capacitor (C2), a second resistor (R2) and a diode (D3), wherein an anode terminal of the diode (D3) is connected to one of the terminals of the switching transistor (Q1) of the power supply.

15 Claims, 5 Drawing Sheets

INRUSH CURRENT CONTROL

PRIORITY CLAIM

This application claims priority under 35 U.S.C. 119(e) to U.S. Provisional Patent Application No. 61/227,772, filed Jul. 22, 2009, entitled POWER SUPPLY WITH INRUSH CURRENT CONTROL, and U.S. Provisional Patent Application No. 61/232,735, filed Aug. 10, 2009, entitled POWER SUPPLY WITH INRUSH CURRENT CONTROL, both of which are incorporated herein by reference.

BACKGROUND

Input inrush current control is often required, e.g., for AC/DC power supplies with bulk capacitors on the rectifier output to prevent a fuse or an upstream over current protection device from being triggered. Additionally, a hot pluggable telecom DC/DC power supply, e.g., a 48V DC/DC brick power supply, also needs an input inrush control circuit to protect the input pins from being damaged by arcing.

Conventional inrush control circuits are often implemented by a resistor in parallel with a relay. However, the relay control winding typically consumes 10 to 20 mA, which is more power consuming than desired, especially where the desire is to meet ENERGY STAR standby power requirements or other efficiency standards.

Alternative active inrush current control circuits may use a TRIAC in parallel with a resistor. While such alternative circuits do not have the same power loss issues as conventional inrush control circuits that include a relay, they need a floating bias gate drive source, which is not always practical and/or desired.

As can be appreciated from the above description, there is still a need for improved inrush current control circuits.

SUMMARY

Certain embodiments of the present invention are directed to inrush current control circuits to selectively short-circuit bypass an inrush current limiting resistor (R1) of a power supply that includes a switching transistor (Q1), wherein the switching transistor (Q1) includes a control terminal (gate or base) driven in dependence on a pulse width modulated (PWM) drive signal.

In accordance with specific embodiments, the inrush current control circuit includes a bypass transistor (e.g., Q3), a first resistor (e.g., R3), a capacitor (e.g., C2), a second resistor (e.g., R2) and a diode (e.g., D3). The bypass transistor (Q3) includes a control terminal (gate or base), a first current path terminal (source or emitter) and a second current path terminal (drain or collector), with a current path between the first and second current path terminals, wherein the current path is connected in parallel with the inrush current limiting resistor (R1). The first resistor (R3) has a first resistor terminal connected to the control terminal (gate or base) of the bypass transistor (Q3), and has a second resistor terminal connected to the first current path terminal (source or emitter) of the bypass transistor (Q3). The capacitor (C2) has a first capacitor terminal connected to the control terminal (gate or base) of the bypass transistor (Q3), and has a second capacitor terminal connected to the first current path terminal (source or emitter) of the bypass transistor (Q3). The second resistor (R2) has a first resistor terminal connected to the control terminal (gate or base) of the bypass transistor (Q3), and has a second resistor terminal. The diode (D3) has a cathode terminal connected to the second resistor terminal of the second resistor (R2), and has an anode terminal connected to one of the terminals of the switching transistor (Q1) of the power supply.

In certain embodiments, the anode terminal of the diode (D3) is connected to the control terminal (gate or base) of the switching transistor (Q1) of the power supply. In such embodiments, after the power supply is plugged into a power outlet, turned on or hot-plugged, the control terminal (gate or base) of the switching transistor (Q1) begins to receive the PWM drive signal and is selectively turned on and off by the PWM signal. When the switching transistor (Q1) is selectively turned on by the PWM drive signal, a voltage at the control terminal of the switching transistor (Q1) will charge up a voltage at the control terminal of the bypass transistor (Q3) through the diode (D3) and the second resistor (R2), which will cause the bypass transistor (Q3) to switch from being turned off to being turned on, thereby causing the current path of the bypass transistor (Q3) to provide a short-circuit bypass of the inrush current limiting resistor (R1) at a turn-on time constant after the power supply is plugged into a power outlet, turned on or hot-plugged. The diode (D3) keeps the voltage at the control terminal (gate or base) of the bypass transistor (Q3) sufficiently high to keep the bypass transistor (Q3) turned on during periods when the PWM drive signal causes the switching transistor (Q1) to be selectively turned off. The turn-on time constant is dependent on the second resistor (R2) and the capacitor (C2).

In accordance with alternative embodiments, the anode terminal of the diode (D3) is connected to the second current path terminal (collector or drain) of the switching transistor (Q1) of the power supply. In such embodiments, after the power supply is plugged into a power outlet, turned on or hot-plugged, the control terminal (gate or base) of the switching transistor (Q1) begins to receive the PWM drive signal and is selectively turned on and off by the PWM signal. When the switching transistor (Q1) is selectively turned off by the PWM drive signal, a voltage at the anode of the diode (D3) will charge up a voltage at the control terminal of the bypass transistor (Q3), which will cause the bypass transistor (Q3) to switch from being turned off to being turned on, thereby causing the current path of the bypass transistor (Q3) to provide a short-circuit bypass of the inrush current limiting resistor (R1) at a turn-on time constant after the power supply is plugged into a power outlet, turned on or hot-plugged.

Embodiments of the present invention are also directed to power supplies that include an inrush current control circuit, such as those summarized above. Additionally, embodiments of the present invention are also directed to amplifiers that include such power supplies. Further embodiments of the present invention are also directed to methods for controlling an inrush current of a power supply.

This summary is not intended to summarize all of the embodiments of the present invention. Further and alternative embodiments, and the features, aspects, and advantages of the embodiments of invention will become more apparent from the detailed description set forth below, the drawings and the claims.

DETAILED DESCRIPTION

Specific embodiments of the present invention control an input inrush current with a low number of components and simple connections. Therefore, such embodiments can be used for low cost and high density applications. Embodiments of the present invention can be used in double-ended DC/DC converters with a high side MOSFET or IGBT such as two-switch forward DC/DC converter, half bridge DC/DC converter and full bridge DC/DC converter, but are not limited thereto. Embodiments of the present invention can also be used in an AC/DC converter power supply, as will be described below with reference to FIGS. 3 and 4.

Figure 1:
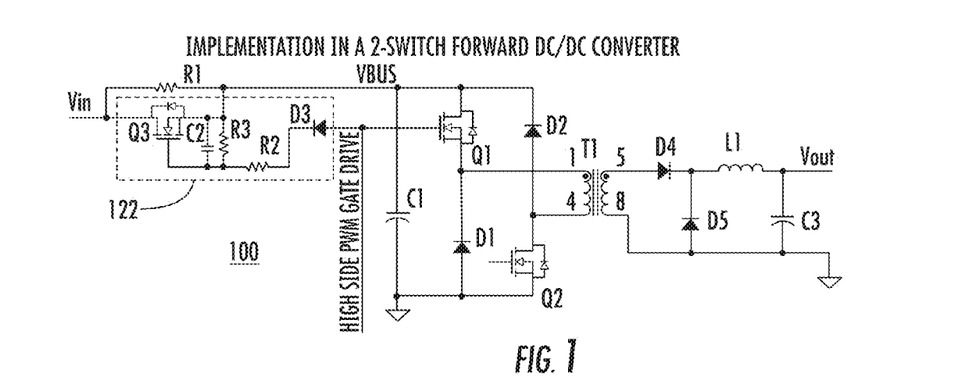
FIG. 1 illustrates an inrush current control circuit, according to an embodiment of the present invention, implemented in a two-switch forward DC/DC converter power supply.
Figure 2:
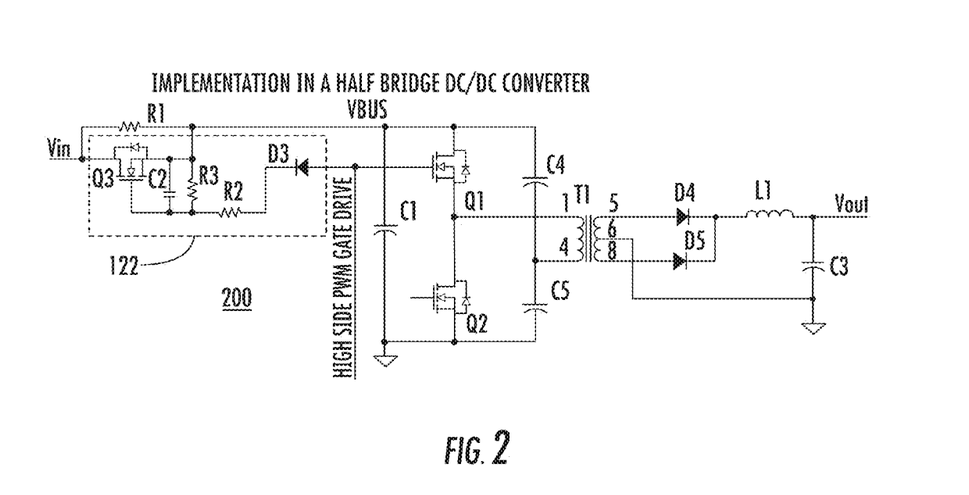
FIG. 2 illustrates an inrush current control circuit, according to an embodiment of the present invention, implemented in a half bridge DC/DC converter power supply.

FIGS. 1 and 2 demonstrate an implementation of an inrush current control circuit 122 in a two-switch forward DC/DC converter 100 and a half bridge DC/DC converter 200, respectively, each of which includes a high side switching transistor Q1. The inrush current control circuit 122 can be implemented in any other converter or inverter with a high side switching transistor, such as a full bridge DC/DC converter and a single phase or three-phase bridge inverter, but is not limited thereto. The high side switching transistor can be, e.g., a metal oxide semiconductor field-effect transistor (MOSFET), an insulated gate bipolar transistor (IGBT), or a bipolar junction transistor (BJT).

As can be seen in FIGS. 1 and 2, each power supply includes an input bulk capacitor C1 to filter out the ripple voltage and hold up energy of a high voltage line (VBUS). When the power supply is plugged into a power outlet, turned on or hot-plugged, the low impedance input source can quickly charge up the bulk capacitor C1 and cause a high inrush current and/or arcing. If not limited, the high inrush current can trigger an upstream fuse or circuit breaker and/or damage devices in the input circuit such as a bridge rectifier in an off-line power supply. The arcing can damage the contact of an ON/OFF switch or the connector pins.

Figure 3:
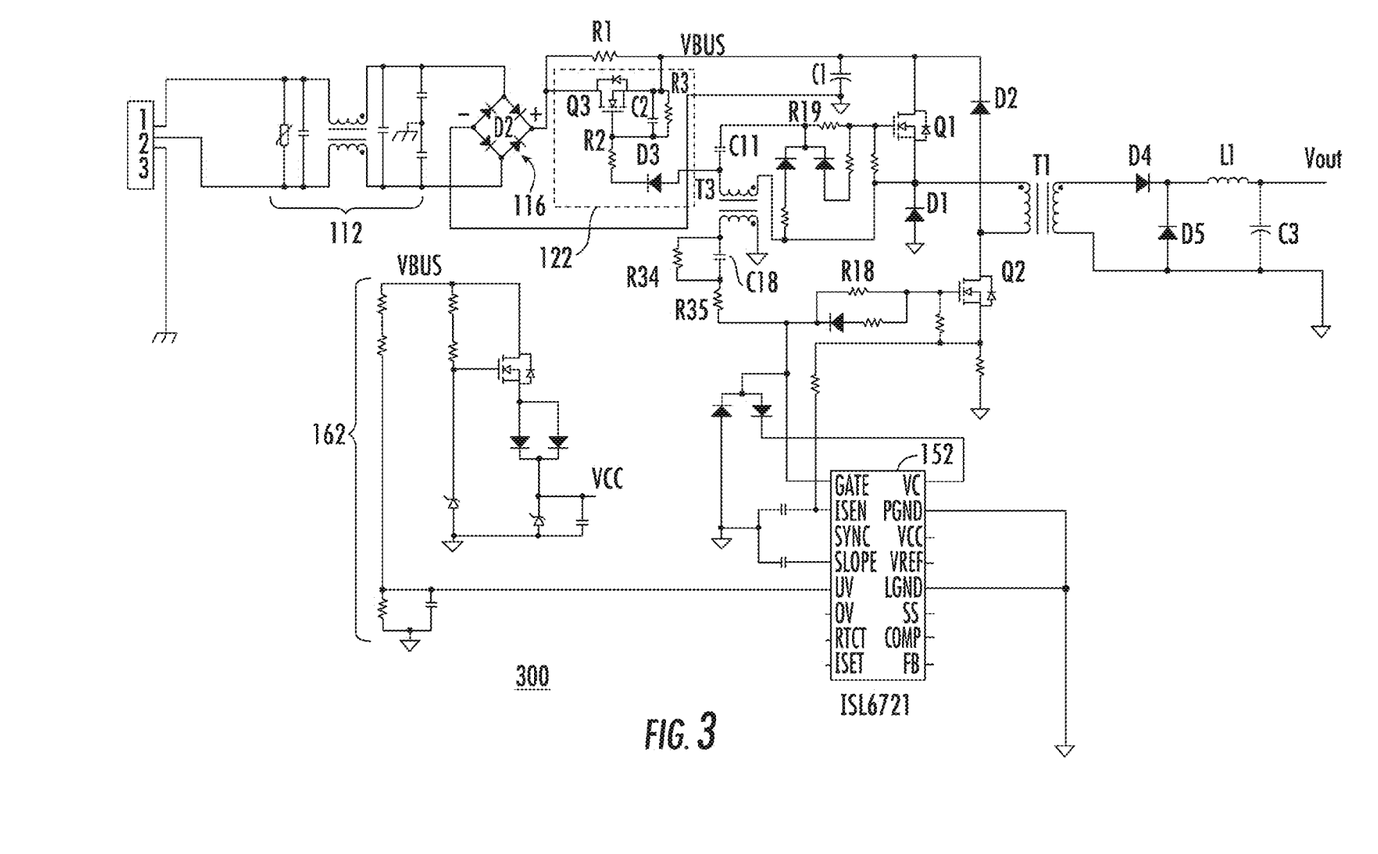
FIG. 3 illustrates an inrush current control circuit of an embodiment of the present invention being used in a power supply that includes an AC/DC conversion, in accordance with an embodiment of the present invention.

In FIG. 1, the 2-switch forward DC/DC converter 100 includes an inrush current limiting resistor (R1) in series with the high voltage line (VBUS), a pair of N-channel MOSFETs Q2 and Q1, a pair of diodes D2 and D1, a transformer T1, a further pair of diodes D4 and D5, and an LC filter including an inductor L1 and a capacitor C3. The transistors Q2 and Q1 can also be referred to, respectively, as a low side switching transistor and a high side switching transistor. The control terminal (e.g., gate or base) of the high side switching transistor Q1 receives a high side pulse width modulation (PWM) signal from a pulse width modulation (PWM) controller (not shown in FIG. 1, but an example of which is shown in FIG. 3). The PWM controller can be implemented, e.g., using an ISL6721 single-ended PWM current mode controller available from Intersil of Milpitas, Calif., but is not limited thereto. In the embodiment of FIG. 1, the low side switching transistor Q2 is driven by a low side PWM signal from the PWM controller, where the low side PWM signal is in-phase with the high side PWM signal.

The transformer T1 includes a primary winding and a secondary winding, and is used to step-down (or step-up) the voltage at the primary side to another voltage level at the secondary side. The diodes D4 and D5 are rectifier and free-wheeling diodes, respectively, which shape the high frequency AC output voltage of the secondary winding of the transformer T1 to single polarity pulses. The inductor L1 and the capacitor C3 form a low pass filter that filters out the high frequency AC components in the single polarity pulses, causing Vout to be a DC voltage.

The DC/DC converter 100 also includes an inrush current control circuit 122, according to an embodiment of the present invention. The inrush current control circuit 122 includes a transistor Q3 having a source-drain current path (or alternatively, an emitter-collector path) connected in parallel with the inrush current limiting resistor R1. The inrush current limiting resistor R1 can be, e.g., a 50 Ohm 1 W or 2 W resistor, PTC or NTC, but is not limited thereto. Additionally, the inrush current control circuit 122 includes a capacitor C2, resistors R2 and R3, and a diode D3. The capacitor C2 is connected between the source and the gate of the transistor Q3. The resistor R3 is connected in parallel with the capacitor C2. The resistor R2 is connected between the gate of the transistor Q3 and the cathode of the diode D3. The anode of the diode D3 is connected to the high side switching transistor Q1 of the power supply.

In the inrush current control circuit 122, the transistor Q3 is off before plug-in, power-on or hot-plug of the circuit (e.g., a power supply) that includes the DC/DC converter 100. The inrush current limiting resistor R1 is connected in the input circuit to limit charge current provided by the high voltage line (VBUS) to the capacitor C1. The R1 resistance (i.e., the Ohmic value of the inrush current limiting resistor) determines the peak inrush current.

When voltage stored by the bulk capacitor C1 is charged up to higher than an under voltage protection threshold, the DC/DC converter starts to work and a PWM gate drive signal is provided to the gate of the high side switching transistor Q1. When the Q1 gate voltage is high, the transistor Q1 turns on. Since the drain to source voltage of the transistor Q1 is close to zero when the transistor Q1 is turned on, its high gate voltage also applies to the gate of the transistor Q3 through the diode D3 and the resistor R2 to charge the gate of the transistor Q3 up and turns on the transistor Q3 to short-circuit bypass the inrush current limiting resistor R1. When the PWM gate drive signal causes the voltage at the gate of the transistor Q1 to be low, the transistor Q1 turns off and the gate-to-source voltage of the transistor Q1 goes to less than the VBUS voltage. The diode D3 is then back-biased to keep the gate of the transistor Q3 from being discharged. In this manner, the transistor Q3 is always on whenever the DC/DC converter is running and drawing high input current. When the DC/DC converter is unplugged, power downed or hot-unplugged, the voltage stored by capacitor C1 is discharged and the transistor Q3 turns off, so that the inrush current limiting resistor R1 can provide current limiting the next time the power supply is plugged in, powered on or hot-plugged. Because the transistor Q3 is used to selectively bypass the inrush current limiting resistor R1, the transistor Q3 can be referred to as the bypass transistor Q3.

The resistor R2 is used to weaken the interaction between the gates of the transistors Q1 and Q3. The capacitor C2 helps to hold up the voltage at the gate of the transistor Q3 to keep the transistor Q3 turned on (i.e., to keep the transistor Q3 from turning off) during load and line transients when the Q1 gate drive PWM signal shortly disappears. The resistor R3 provides a discharge path for the capacitor C2 and the gate of the transistor Q3 to reset (turn off) the transistor Q3 after the power supply is unplugged, powered off, or hot unplugged. The resistors R2 and R3 and the capacitor C2 of the inrush current control circuit 122 are used to define the turn-on time constant, which specifies how long it takes to turn-on the transistor Q3 after the power supply is plugged in, powered on, or hot plugged. The resistor R3 and the capacitor C2 are used to define the turn-off time constant, which specifies how long it takes to turn-off the transistor Q3 after the power supply is unplugged, powered off, or hot unplugged. More specifically, the turn-on time constant (T_on) can be determined in accordance with the following equation:

$$T\_on = C2*(R2||R3),$$
$$= C2*(R2*R3)/(R2+R3).$$

The turn-off time constant (T_off) can be determined in accordance with the following equation:

$$T\_off=C2*R3.$$

The inrush current control circuit 122 operates in a similar manner when implemented in the half bridge DC/DC converter of FIG. 2, and thus, need not be described again in detail. However, it is noted that in the embodiment of FIG. 2, the low side switching transistor Q2 is driven by a low side PWM signal from the PWM controller, where the low side PWM signal is 180 degrees out of phase with the high side PWM signal.

In FIGS. 1 and 2 (as well as FIG. 3 discussed below), if the high side switching transistor Q1 of the converter or inverter is a FET, then the transistor Q3 can be, e.g., an IGBT or a FET, as mentioned above. However, if the high side switching transistor Q1 is a BJT, then the transistor Q3 can be, e.g., a FET, an IGBT or even a BJT transistor.

FIG. 3 shows an offline AC/DC power supply 300 that is implemented as a switched-mode power supply (SMPS), in accordance with an embodiment. The power supply 300 is shown as including an electromagnetic interference (EMI) filter 112 and a full-wave rectifier 116, which filter and fully rectify an AC voltage received, e.g., from a two or three wire power outlet when the power supply 300 is plugged in to power outlet. Additionally, the power supply 300 includes the inrush current limiting resistor R1, and the inrush current controller 122, according to an embodiment of the present invention. As in FIGS. 1 and 2, the inrush current control circuit 122 includes transistor Q3, capacitor C2, resistors R2 and R3, and diode D3.

Referring to FIG. 3, the positive (+) terminal of the full-wave rectifier is connected to a terminal of the inrush current control resistor R1, and the negative (−) terminal of the full-wave rectifier 116 is connected to ground (or some other low voltage rail). The other terminal of the inrush current control resistor R1 is connected to the high voltage line (VBUS). Also shown is the bulk capacitor C1 (which may be implemented as a single capacitor, or a bank of capacitors connected in parallel) connected between VBUS and ground (or some other low voltage line).

In a similar manner as was discussed above with regards to FIGS. 1 and 2, the inrush current limiting resistor R1 limits the inrush current produced when the power supply 300 is plugged into a power outlet, turned on or hot-plugged. Such inrush current, if not limited, may trigger a system level input fuse (not shown), may trigger a circuit breaker in the line providing the AC voltage, and/or may damage circuitry such as the diodes D2 of the H-bridge full-wave rectifier 116.

Still referring to FIG. 3, the power supply 300 also includes a DC-DC converter, which converts (in this example, steps-down) the high voltage produced by the capacitor C1 to a lower voltage. The DC-DC converter is shown as including the pair of N-channel MOSFETs Q2 and Q1 (respectively, a low side switching transistor and a high side switching transistor), the pair of diodes D2 and D1, and the transformer T1.

Additionally, the power supply 300 includes a pulse width modulation (PWM) controller 152. The PWM controller 152 can be implemented, e.g., using an ISL6721 single-ended PWM current mode controller available from Intersil of Milpitas, Calif., but is not limited thereto. The GATE output (also referred to as a gate control output or the PWM output) of the PWM controller 152 is connected to the gate of transistor Q2 (through resistor R18) and to one side of a high-side gate drive transformer T3 (through resistor R35, coupling capacitor C18 and resistor R34). The other side of the gate drive transformer T3 is connected to the gate of the transistor Q1 (through coupling capacitor C11 and resistor R19). In this configuration, the PWM controller 152 provides low side and high side PWM gate drive signals to the gates of transistors Q2 and Q1, to control the switching of the transistors Q2 and Q1.

An under voltage (UV) input of the PWM controller 152 is connected to an output of a voltage divider 162, which will cause the PWM controller 152 to produce a PWM output (at the GATE output) when VBUS reaches a specified level. Stated another way, the PWM controller 152 will not produce the PWM output (at the GATE output) until the UV input reaches a predefined UV level. Also, when the voltage provided to the UV input transitions from being above the predefined UV level to be below the predefined UV level, PWM controller 152 will stop producing the PWM output at its GATE output.

After the PWM controller 152 starts causing the gates of the transistors Q2 and Q1 to be driven by PWM signals, the transistors Q2 and Q1 will be turned on and off by the PWM signals. For example, when the voltage at a certain pin (connected to a terminal of capacitor C11 and the anode of diode D3) of the gate drive transformer T3 is high, the gate of the transistor Q1 is high, which turns on the transistor Q1. When the transistor Q1 is turned on, the gate voltage of the transistor Q1 will be higher (e.g., by 12 Volts) than the VBUS voltage. This 12 Volts (or some other voltage) relative to VBUS will charge up the voltage at the gate of transistor Q3 through a diode D3 and a resistor R2 (where the transistor Q3, diode D3 and resistor R2 are part of the inrush current controller 122), which will cause the transistor Q3 to turn-on. When the transistor Q3 is turned on, the drain-source path of the transistor Q3 will provide a short-circuit bypass of the inrush current limiting resistor R1. The diode D3 keeps the voltage at the drain of the transistor Q3 sufficiently high to keep the transistor Q3 turned on during the periods when the PWM signal (provided by the PWM controller 152) causes the transistor Q1 to be turned off (i.e., when the PWM signal provided to the gate of the transistor Q1 is low).

As in FIGS. 1 and 2, in FIG. 3 the resistors R2 and R3 and the capacitor C2 of the inrush current control circuit 122 are used to define the turn-on time constant, and the resistor R3 and the capacitor C2 are used to define the turn-off time constant.

Use of the inrush current controller 122 is more energy efficient than the conventional use of a relay in parallel with the inrush current limiting resistor R1. Further, the inrush current controller 122 can be used to eliminate sparc arcing caused by an inrush charge current in a hot-pluggable DC/DC power supply.

In FIG. 3 the inrush current controller 122 is shown as being used in a power supply that includes an AC/DC conversion. The inrush current controller 122 can also be used in a DC/DC power supply, as can be appreciated from FIGS. 1 and 2 discussed above, as well as in other power supplies.

Figure 4:
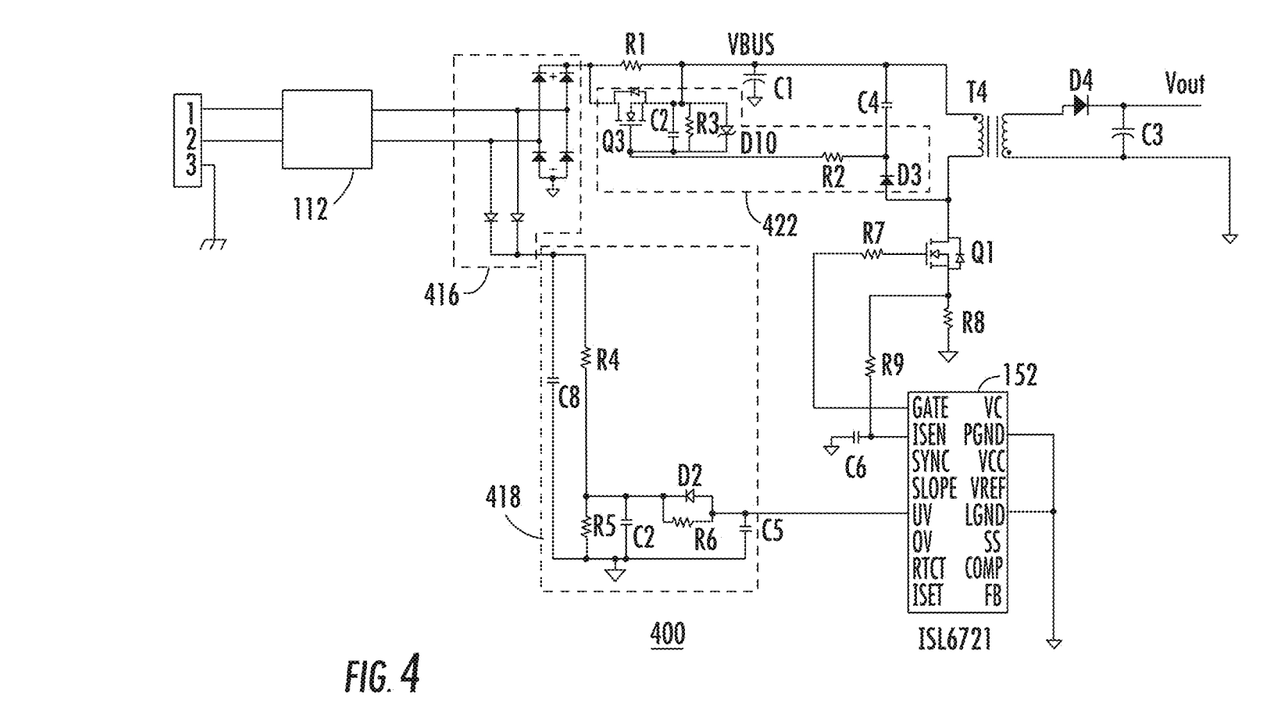
FIG. 4 illustrates an inrush current control circuit, according to an embodiment of the present invention, implemented in an AC/DC flyback converter power supply.

FIG. 4 shows an offline AC/DC flyback converter power supply 400 that includes an inrush current control circuit 422, in accordance with an embodiment of the present invention. The power supply 400 is shown as including an electromagnetic interference (EMI) filter 112 and a full-wave rectifier 416, which fully rectify an AC voltage received, e.g., from a two or three wire power outlet when the power supply 400 is plugged in. The six diodes of the fully-wave rectifier 416 provide full wave rectification of an AC voltage signal for both the main portion of the power supply 400 (shown to the right of the rectifier 416) as well as for an input voltage sense circuit 418 (shown below the rectifier 416).

The inrush current control circuit 422 includes transistor Q3, capacitors C2 and C4, resistors R2 and R3, and diode D3. The inrush current control circuit also includes zener diode D10 to clamp the maximum gate voltage of transistor Q3. Diodes D3 and D10, capacitor C4 and resistors R2 and R3 also form a RCD snubber to clamp the maximum peak drain to source voltage on transistor Q1.

Additionally, the power supply 400 includes a pulse width modulation (PWM) controller 152. The PWM controller 152 can be implemented, e.g., using an ISL6721 single-ended PWM current mode controller available from Intersil of Milpitas, Calif., but is not limited thereto. The gate control output of the PWM controller 152 is connected to the gate of transistor Q1 (through resistor R7)

Still referring to FIG. 4, the positive (+) terminal of the full-wave rectifier 416 is connected to a terminal of the inrush current control resistor R1, and the negative (−) terminal of the full-wave rectifier 416 is connected to ground (or some other low voltage rail). Another terminal of the inrush current control resistor R1 is connected to the voltage line labeled VBUS. Also shown is the bulk capacitor C1 (which may be implemented as a single capacitor, or a bank of capacitors connected in parallel) connected between VBUS and ground (or some other low voltage line).

As was the case in FIGS. 1-3, the inrush current limiting resistor R1 limits the inrush current produced when the power supply 400 is plugged into a power outlet, turned on or hot-plugged. Such inrush current, if not limited, may trigger a system level input fuse (not shown), may trigger a circuit breaker in the line providing the AC voltage, and/or may damage circuitry such as the diodes of the full-wave rectifier 416.

An input voltage sense and RC delay circuit 418 produces a voltage sense signal that is provided to the under voltage (UV) input of the PWM controller 152, which will cause the PWM controller 152 to produce a PWM output (at the GATE output) when the sensed voltage reaches a predetermined UV level. The values of the resistors and capacitors within the input voltage sense and RC delay circuit 418 are selected for slow turn-on and fast turn-off. More specifically, the capacitor C5 (which stores the voltage to be provided to the UV input of the PWM controller 152), is charged up slowly after plug-in, power-on or hot-plug of the power supply 400, but is discharged quickly after the power supply is unplugged, powered-off or hot-unplugged. The slow charging up of capacitor C5 ensures that the PWM controller 152 does not start driving the gate of transistor Q1 until after the bulk capacitor C1 is fully charged. The fast discharge of capacitor C5 ensures that after the power supply is unplugged from a power outlet, turned off or hot-unplugged, the next time the power supply is plugged-in, powered-on or hot-plugged the voltage stored by C5 is zero, or close to zero, so that under voltage protection is initially provided.

After the PWM controller 152 starts causing the gate of the transistor Q1 to be driven by PWM signals, the transistor Q1 will be turned on and off by the PWM signals.

When the transistor Q1 is turned off the polarity of the primary winding of transformer T4 will change and a current will flow through D3 and charge up the capacitor C4 such that the node where C4, R2 and D3 are connected together will be higher than the VBUS voltage. This higher voltage relative to VBUS will charge up the voltage at the gate of transistor Q3 through the resistor R2 (where the transistor Q3, diode D3 and resistor R2 are part of the inrush current controller 422), which will cause the transistor Q3 to turn-on. When the transistor Q3 is turned on, the drain-source path (or collector-emitter path) of the transistor Q3 will provide a short-circuit bypass of the inrush current limiting resistor R1. The diode D3 and capacitor C4 keep the voltage at the drain of the transistor Q3 sufficiently high to keep the transistor Q3 turned on during the periods when the PWM signal (provided by the PWM controller 152) causes the transistor Q1 to be turned on (i.e., when the PWM signal provided to the gate of the transistor Q1 is high).

As in FIGS. 1-3, in FIG. 4 the resistors R2 and R3 and the capacitor C2 of the inrush current control circuit 422 are used to define the turn-on time constant, and the resistor R3 and the capacitor C2 are used to define the turn-off time constant. The time constants formulas for FIG. 4 are the same as in FIGS. 1-3. However, since the voltage on capacitor C4 is much higher than the Q1 gate voltage in FIGS. 1-3, the turn on time is much shorter with the same time constant and the zener diode D10 will eventually trigger to clamp the gate voltage of transistor Q3 in the acceptable level.

The transformer T4, the transistor Q1, the diode D4 and the capacitor C3 are connected as a flyback converter, which is a buck-boost converter with the inductor split to form a transformer, so that the voltage ratios are multiplied with an additional advantage of isolation. The transformer T4 includes a primary winding and a secondary winding, and is used to step-down (or step-up) the voltage at the primary side to another voltage level at the secondary side. The diode D4 shapes the high frequency AC output voltage of the secondary winding of the transformer T4 to single polarity pulses. The switching transistor Q1 is the flyback switch for the flyback converter.

Figure 5:
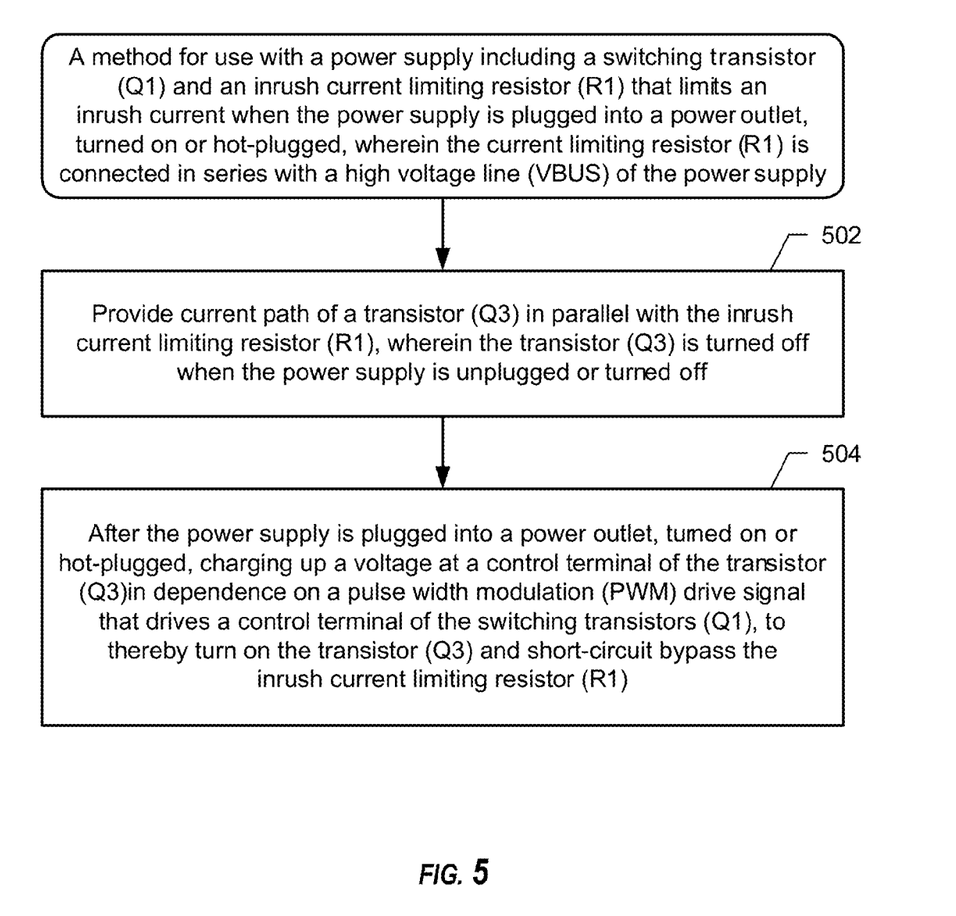
FIG. 5 is a high level flow diagram that is used to summarize a method according to an embodiment of the present invention.

FIG. 5 is a high level flow diagram that is used to summarize a method for use with a power supply including a switching transistor (e.g., Q1) and an inrush current limiting resistor (e.g., R1) that limits an inrush current when the power supply is plugged into a power outlet, turned on or hot-plugged, wherein the current limiting resistor (R1) is connected in series with a high voltage line (e.g., VBUS) of the power supply. As indicated by step 502, a current path of a bypass transistor (e.g., Q3) is provided in parallel with the inrush current limiting resistor (R1), wherein the bypass transistor (Q3) is turned off when the power supply is unplugged or turned off. As indicated by step 504, after the power supply is plugged into a power outlet, turned on or hot-plugged, a voltage at a control terminal of the bypass transistor (Q3) is charged up in dependence on a pulse width modulation (PWM) drive signal that drives a control terminal (gate or base) of the switching transistors (Q1), to thereby turn on the bypass transistor (Q3) and short-circuit bypass the inrush current limiting resistor (R1). As can be appreciated by the description of FIGS. 1-4, step 504 can include charging up the voltage at the control terminal of the bypass transistor (Q3) to a voltage that is greater than a voltage of the high voltage line (VBUS) of the power supply, to thereby turn on the bypass transistor (Q3) and short-circuit bypass the inrush current limiting resistor (R1).

Figure 6:
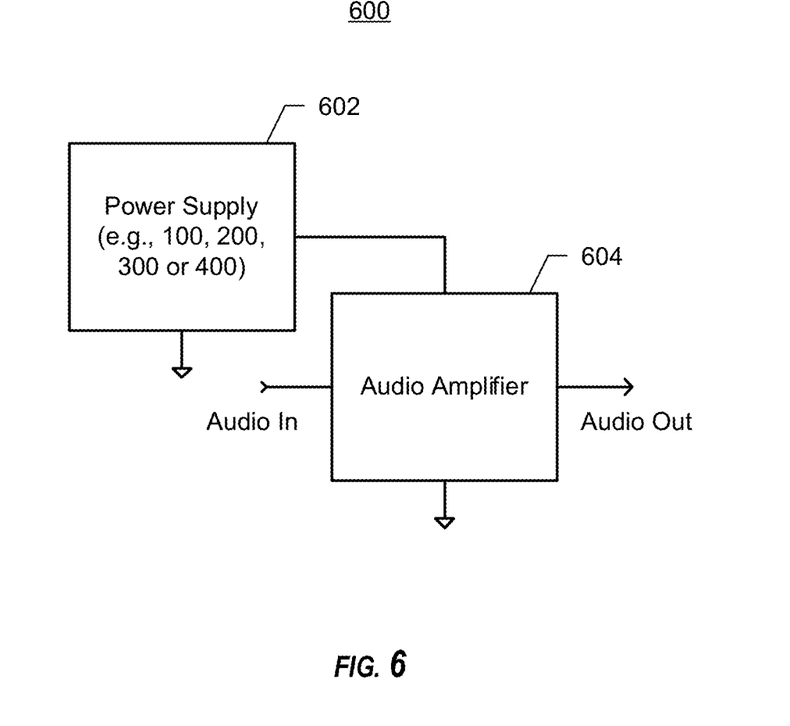
FIG. 6 illustrates an exemplary system including an amplifier, according to an embodiment of the present invention.

The power supplies of embodiments of the present invention can be used to power amplifier systems, and thus, embodiments of the present invention are also directed to amplifier systems that include the power supplies described above. Such amplifier system can be, e.g., audio amplifier system, but are not limited thereto. An exemplary amplifier system 600, according to an embodiment of the present invention, is show in FIG. 6. Referring to FIG. 6, an amplifier 604 is shown as receiving power from a power supply 602 (e.g., 100, 200, 300 or 400) that includes an inrush current control circuit (e.g., 122 or 422) described in detail above. The amplifier 604 includes at least one input terminal to accept an input signal, at least one output terminal to output an amplified output signal, as well as a pair of power supply terminals. One of the power supply terminal can be connected to the output of the power supply 602, and the other power supply terminal can be connected to ground or some other low voltage line. While the input and output are shown as being audio signals, and the amplifier is shown as being an audio amplifier, embodiments of the present invention are not limited thereto.

While various embodiments of the present invention have been described above, it should be understood that they have been presented by way of example, and not limitation. It will be apparent to persons skilled in the relevant art that various changes in form and detail can be made therein without departing from the spirit and scope of the invention.

What is claimed:

1. An inrush current control circuit to selectively short-circuit bypass an inrush current limiting resistor (R1) of a power supply that includes a switching transistor (Q1), wherein the switching transistor (Q1) includes a control terminal (gate or base) driven in dependence on a pulse width modulated (PWM) drive signal, a first current path terminal (source or emitter) and a second current path terminal (collector or drain), and wherein inrush current control circuit comprises:

a bypass transistor (Q3) including a control terminal (gate or base), a first current path terminal (source or emitter) and a second current path terminal (collector or drain), with a current path between the first and second current path terminals, wherein the current path is connected in parallel with the inrush current limiting resistor (R1);

a first resistor (R3) having a first resistor terminal connected to the control terminal (gate or base) of the bypass transistor (Q3), and having a second resistor terminal connected to the first current path terminal (source or emitter) of the bypass transistor (Q3);

a capacitor (C2) having a first capacitor terminal connected to the control terminal (gate or base) of the bypass transistor (Q3), and having a second capacitor terminal connected to the first current path terminal (source or emitter) of the bypass transistor (Q3);

a second resistor (R2) having a first resistor terminal connected to the control terminal (gate or base) of the bypass transistor (Q3), and having a second resistor terminal; and a diode (D3) having a cathode terminal connected to the second resistor terminal of the second resistor (R2), and having an anode terminal connected to the control terminal (gate or base) of the switching transistor (Q1) of the power supply.

2. The inrush current control circuit of claim 1, wherein after the power supply is plugged into a power outlet, turned on or hot-plugged, the control terminal (gate or base) of the switching transistor (Q1) begins to receive the PWM drive signal and is selectively turned on and off by the PWM signal; and wherein when the switching transistor (Q1) is selectively turned on by the PWM drive signal, a voltage at the control terminal of the switching transistor (Q1) will charge up a voltage at the control terminal of the bypass transistor (Q3) through the diode (D3) and the second resistor (R2), which will cause the bypass transistor (Q3) to switch from being turned off to being turned on, thereby causing the current path of the bypass transistor (Q3) to provide a short-circuit bypass of the inrush current limiting resistor (R1) at a turn-on time constant after the power supply is plugged into a power outlet, turned on or hot-plugged.

3. The inrush current control circuit of claim 2, wherein the diode (D3) keeps the voltage at the control terminal (gate or base) of the bypass transistor (Q3) sufficiently high to keep the bypass transistor (Q3) turned on during periods when the PWM drive signal causes the switching transistor (Q1) to be selectively turned off.

4. The inrush current control circuit of claim 2, wherein the turn-on time constant is dependent on the second resistor (R2) and the capacitor (C2).

5. An inrush current control circuit to selectively short-circuit bypass an inrush current limiting resistor (R1) of a power supply that includes a switching transistor (Q1), wherein the switching transistor (Q1) includes a control terminal (gate or base) driven in dependence on a pulse width modulated (PWM) drive signal, a first current path terminal (source or emitter) and a second current path terminal (collector or drain), and wherein inrush current control circuit comprises:

a bypass transistor (Q3) including a control terminal (gate or base), a first current path terminal (source or emitter) and a second current path terminal (collector or drain), with a current path between the first and second current path terminals, wherein the current path is connected in parallel with the inrush current limiting resistor (R1);

a first resistor (R3) having a first resistor terminal connected to the control terminal (gate or base) of the bypass transistor (Q3), and having a second resistor terminal connected to the first current path terminal (source or emitter) of the bypass transistor (Q3);

a capacitor (C2) having a first capacitor terminal connected to the control terminal (gate or base) of the bypass transistor (Q3), and having a second capacitor terminal connected to the first current path terminal (source or emitter) of the bypass transistor (Q3);

a second resistor (R2) having a first resistor terminal connected to the control terminal (gate or base) of the bypass transistor (Q3), and having a second resistor terminal; and a diode (D3) having a cathode terminal connected to the second resistor terminal of the second resistor (R2), and having an anode terminal connected to the second current path terminal (collector or drain) of the switching transistor (Q1) of the power supply;

wherein after the power supply is plugged into a power outlet, turned on or hot-plugged, the control terminal (gate or base) of the switching transistor (Q1) begins to receive the PWM drive signal and is selectively turned on and off by the PWM signal; and wherein when the switching transistor (Q1) is selectively turned off by the PWM drive signal, a voltage at the cathode of the diode (D3) will charge up a voltage at the control terminal of the bypass transistor (Q3), which will cause the bypass transistor (Q3) to switch from being turned off to being turned on, thereby causing the current path of the bypass transistor (Q3) to provide a short-circuit bypass of the inrush current limiting resistor (R1) at a turn-on time constant after the power supply is plugged into a power outlet, turned on or hot-plugged.

6. A power supply, comprising:
a full bridge rectifier;
an inrush current limiting resistor (R1) connected between a positive (+) terminal of the full bridge rectifier and a high voltage line (VBUS);
a bulk capacitor (C1) connected between the high voltage line (VBUS) and ground;
a switching transistor (Q1) including a control terminal (gate or base) driven in dependence on a pulse width modulated (PWM) drive signal, a first current path terminal (source or emitter) and a second current path terminal (collector or drain); and
an inrush current control circuit to selectively short-circuit bypass the inrush current limiting resistor (R1);
wherein the inrush current control circuit comprises
  a bypass transistor (Q3) including a control terminal (gate or base), a first current path terminal (source or emitter) and a second current path terminal (collector or drain), with a current path between the first and second current path terminals, wherein the current path is connected in parallel with the inrush current limiting resistor (R1);
  a first resistor (R3) having a first resistor terminal connected to the control terminal (gate or base) of the bypass transistor (Q3), and having a second resistor terminal connected to the first current path terminal (source or emitter) of the bypass transistor (Q3);
  a capacitor (C2) having a first capacitor terminal connected to the control terminal (gate or base) of the bypass transistor (Q3), and having a second capacitor terminal connected to the first current path terminal (source or emitter) of the bypass transistor (Q3);
  a second resistor (R2) having a first resistor terminal connected to the control terminal (gate or base) of the bypass transistor (Q3), and having a second resistor terminal; and
  a diode (D3) having a cathode terminal connected to the second resistor terminal of the second resistor (R2), and having an anode terminal connected to the control terminal (gate or base) of the switching transistor (Q1) of the power supply.

7. The power supply of claim 6, wherein after the power supply is plugged into a power outlet, turned on or hot-plugged, the control terminal (gate or base) of the switching transistor (Q1) begins to receive the PWM drive signal and is selectively turned on and off by the PWM signal, and wherein when the switching transistor (Q1) is selectively turned on by the PWM drive signal, a voltage at the control terminal of the switching transistor (Q1) will charge up a voltage at the control terminal of the bypass transistor (Q3) through the diode (D3) and the second resistor (R2), which will cause the bypass transistor (Q3) to switch from being turned off to being turned on, thereby causing the current path of the bypass transistor (Q3) to provide a short-circuit bypass of the inrush current limiting resistor (R1) at a turn-on time constant after the power supply is plugged into a power outlet, turned on or hot-plugged.

8. The power supply of claim 7, wherein the diode (D3) keeps the voltage at the control terminal (gate or base) of the bypass transistor (Q3) sufficiently high to keep the bypass transistor (Q3) turned on during periods when the PWM drive signal causes the switching transistor (Q1) to be selectively turned off.

9. The power supply of claim 7, wherein the turn-on time constant is dependent on the second resistor (R2) and the capacitor (C2).

10. A power supply, comprising:
a full bridge rectifier;
an inrush current limiting resistor (R1) connected between a positive (+) terminal of the full bridge rectifier and a high voltage line (VBUS);
a bulk capacitor (C1) connected between the high voltage line (VBUS) and ground;
a switching transistor (Q1) including a control terminal (gate or base) driven in dependence on a pulse width modulated (PWM) drive signal, a first current path terminal (source or emitter) and a second current path terminal (collector or drain); and
an inrush current control circuit to selectively short-circuit bypass the inrush current limiting resistor (R1);
wherein the inrush current control circuit comprises
  a bypass transistor (Q3) including a control terminal (gate or base), a first current path terminal (source or emitter) and a second current path terminal (collector or drain), with a current path between the first and second current path terminals, wherein the current path is connected in parallel with the inrush current limiting resistor (R1);
  a first resistor (R3) having a first resistor terminal connected to the control terminal (gate or base) of the bypass transistor (Q3), and having a second resistor terminal connected to the first current path terminal (source or emitter) of the bypass transistor (Q3);
  a capacitor (C2) having a first capacitor terminal connected to the control terminal (gate or base) of the bypass transistor (Q3), and having a second capacitor terminal connected to the first current path terminal (source or emitter) of the bypass transistor (Q3);
  a second resistor (R2) having a first resistor terminal connected to the control terminal (gate or base) of the bypass transistor (Q3), and having a second resistor terminal; and
  a diode (D3) having a cathode terminal connected to the second resistor terminal of the second resistor (R2), and having an anode terminal connected to one of the terminals of the switching transistor (Q1) of the power supply;
wherein the switching transistor (Q1) comprises a high side switching transistor with its second current path terminal (collector or drain) connected to the high voltage line (VBUS).

11. A power supply, comprising:
a full bridge rectifier;
an inrush current limiting resistor (R1) connected between a positive (+) terminal of the full bridge rectifier and a high voltage line (VBUS);
a bulk capacitor (C1) connected between the high voltage line (VBUS) and ground;
a switching transistor (Q1) including a control terminal (gate or base) driven in dependence on a pulse width modulated (PWM) drive signal, a first current path terminal (source or emitter) and a second current path terminal (collector or drain); and an inrush current control circuit to selectively short-circuit bypass the inrush current limiting resistor (R1);
wherein the inrush current control circuit comprises
a bypass transistor (Q3) including a control terminal (gate or base), a first current path terminal (source or emitter) and a second current path terminal (collector or drain), with a current path between the first and second current path terminals, wherein the current path is connected in parallel with the inrush current limiting resistor (R1);
a first resistor (R3) having a first resistor terminal connected to the control terminal (gate or base) of the bypass transistor (Q3), and having a second resistor terminal connected to the first current path terminal (source or emitter) of the bypass transistor (Q3);
a capacitor (C2) having a first capacitor terminal connected to the control terminal (gate or base) of the bypass transistor (Q3), and having a second capacitor terminal connected to the first current path terminal (source or emitter) of the bypass transistor (Q3);
a second resistor (R2) having a first resistor terminal connected to the control terminal (gate or base) of the bypass transistor (Q3), and having a second resistor terminal; and
a diode (D3) having a cathode terminal connected to the second resistor terminal of the second resistor (R2), and having an anode terminal connected to the second current path terminal (collector or drain) of the switching transistor (Q1); and
a capacitor (C4) connected between the high voltage line (VBUS) and the cathode of diode (D3);
wherein after the power supply is plugged into a power outlet, turned on or hot-plugged, the control terminal (gate or base) of the switching transistor (Q1) begins to receive the PWM drive signal and is selectively turned on and off by the PWM signal; and
wherein when the switching transistor (Q1) is selectively turned off by the PWM drive signal, a voltage at the anode of the diode (D3) will charge up a voltage at the control terminal of the bypass transistor (Q3), which will cause the bypass transistor (Q3) to switch from being turned off to being turned on, thereby causing the current path of the bypass transistor (Q3) to provide a short-circuit bypass of the inrush current limiting resistor (R1) at a time constant after the power supply is plugged into a power outlet, turned on or hot-plugged.

12. A power supply, comprising:
a full bridge rectifier;
an inrush current limiting resistor (R1) connected between a positive (+) terminal of the full bridge rectifier and a high voltage line (VBUS);
a bulk capacitor (C1) connected between the high voltage line (VBUS) and ground;
a switching transistor (Q1) including a control terminal (gate or base) driven in dependence on a pulse width modulated (PWM) drive signal, a first current path terminal (source or emitter) and a second current path terminal (collector or drain); and
an inrush current control circuit to selectively short-circuit bypass the inrush current limiting resistor (R1);
wherein the inrush current control circuit comprises
a bypass transistor (Q3) including a control terminal (gate or base), a first current path terminal (source or emitter) and a second current path terminal (collector or drain), with a current path between the first and second current path terminals, wherein the current path is connected in parallel with the inrush current limiting resistor (R1);
a first resistor (R3) having a first resistor terminal connected to the control terminal (gate or base) of the bypass transistor (Q3), and having a second resistor terminal connected to the first current path terminal (source or emitter) of the bypass transistor (Q3);
a capacitor (C2) having a first capacitor terminal connected to the control terminal (gate or base) of the bypass transistor (Q3), and having a second capacitor terminal connected to the first current path terminal (source or emitter) of the bypass transistor (Q3);
a second resistor (R2) having a first resistor terminal connected to the control terminal (gate or base) of the bypass transistor (Q3), and having a second resistor terminal; and
a diode (D3) having a cathode terminal connected to the second resistor terminal of the second resistor (R2), and having an anode terminal connected to the second current path terminal (collector or drain) of the switching transistor (Q1); and
wherein the switching transistor (Q1) comprises a flyback switch of a flyback converter.

13. A method for use with a power supply including a switching transistor (Q1) and an inrush current limiting resistor (R1) that limits an inrush current when the power supply is plugged into a power outlet, turned on or hot-plugged, wherein the current limiting resistor (R1) is connected in series with a high voltage line (VBUS) of the power supply, the method comprising:
(a) providing a current path of a bypass transistor (Q3) in parallel with the inrush current limiting resistor (R1), wherein the bypass transistor (Q3) is turned off when the power supply is unplugged or turned off; and
(b) after the power supply is plugged into a power outlet, turned on or hot-plugged, charging up a voltage at a control terminal of the bypass transistor (Q3) in dependence on a pulse width modulation (PWM) drive signal that drives a control terminal of the switching transistors (Q1), to thereby turn on the bypass transistor (Q3) and short-circuit bypass the inrush current limiting resistor (R1).

14. The method of claim 13, wherein step (b) includes charging up the voltage at the control terminal of the bypass transistor (Q3) to a voltage that is greater than a voltage of the high voltage line (VBUS) of the power supply, to thereby turn on the bypass transistor (Q3) and short-circuit bypass the inrush current limiting resistor (R1).

15. A method for use with a power supply including an inrush current limiting resistor (R1) that limits an inrush current when the power supply is plugged into a power outlet, turned on or hot-plugged, wherein the current limiting resistor (R1) is connected in series with a high voltage line (VBUS) of the power supply, the method comprising:
(a) allowing the current limiting resistor to limit current in the power supply for a period of time following the power supply being plugged into a power outlet, turned on or hot-plugged;
(b) during at least a portion of the period of time following the power supply being plugged into a power outlet, turned on or hot-plugged, using a pulse width modulation (PWM) drive signal to drive a control terminal of a switching transistor (Q1) of the power supply; and
(c) short-circuit bypassing the inrush current limiting resistor (R1) after the period of time by charging up a voltage at a control terminal of a bypass transistor (Q3) to a voltage that is greater than a voltage of the high voltage line (VBUS) of the power supply;

wherein the charging up the voltage at the control terminal of the bypass transistor (Q3) is in dependence on the PWM drive signal that is used to drive the control terminal of the switching transistor (Q1) of the power supply.

\* \* \* \* \*

UNITED STATES PATENT AND TRADEMARK OFFICE
CERTIFICATE OF CORRECTION

PATENT NO.         : 8,422,179 B2
APPLICATION NO.    : 12/836153
DATED              : April 16, 2013
INVENTOR(S)        : Zhan et al.

Page 1 of 1

It is certified that error appears in the above-identified patent and that said Letters Patent is hereby corrected as shown below:

In the claims

At column 14, lines 40-41, claim 13: After "switching" and before "(Q1)", delete "transistors" and replace with -- transistor --

Signed and Sealed this
Fifth Day of April, 2016

Michelle K. Lee
*Director of the United States Patent and Trademark Office*